(12) United States Patent
Miyahara

(10) Patent No.: US 6,662,427 B2
(45) Date of Patent: Dec. 16, 2003

(54) METHOD OF FORMING A CAVITY STRUCTURE WITH A THIN BOTTOM BASE PLATE

(75) Inventor: Hideyuki Miyahara, Nagano (JP)

(73) Assignee: Nakamura Seisakusho Kabushikigaisha, Okaya (JP)

( * ) Notice: Subject to any disclaimer, the term of this patent is extended or adjusted under 35 U.S.C. 154(b) by 0 days.

(21) Appl. No.: 09/793,841

(22) Filed: Feb. 26, 2001

(65) Prior Publication Data

US 2001/0018792 A1 Sep. 6, 2001

(30) Foreign Application Priority Data

Mar. 1, 2000 (JP) .......................................... 2000-055313

(51) Int. Cl.[7] .......................... B23P 13/04; B21D 18/00
(52) U.S. Cl. .............................. 29/557; 72/332; 29/558
(58) Field of Search ................... 29/557, 558; 72/332, 72/324, 340, 327, 326, 334, 335

(56) References Cited

U.S. PATENT DOCUMENTS 2,807,970 A * 10/1957 Dorman
3,566,513 A   3/1971  Fuller
6,145,365 A   11/2000 Miyahara
6,155,093 A   12/2000 Lipari

* cited by examiner

Primary Examiner—John C. Hong
(74) Attorney, Agent, or Firm—Flynn, Thiel, Boutell & Tanis, P.C.

(57) ABSTRACT

A method for forming a cavity structure provided with a thin bottom plate is comprises the following steps. The first step is to deform plastically a part of a metal plate so as to form a cavity on one surface of a metal plate wherein the cavity has an oddly bottom surface provided with subsections being different from each other in depth. Simultaneously a protrusion is formed on the other surface of the metal plate by shifting an amount of metal corresponding to the cavity into the protrusion wherein the protrusion has substantially similar figure to the cavity. Then a coupling section, which keeps the protrusion integral with the metal plate, is formed so as to make the protrusion smaller than the cavity. And the protrusion is removed from the metal plate so as to make the other surface of the metal plate flat and to form the bottom plate of the cavity thin while remaining the coupling section.

20 Claims, 6 Drawing Sheets

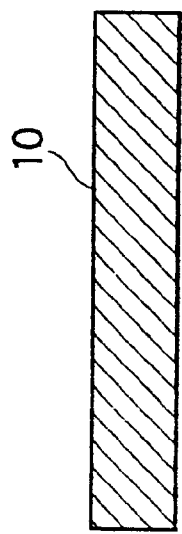
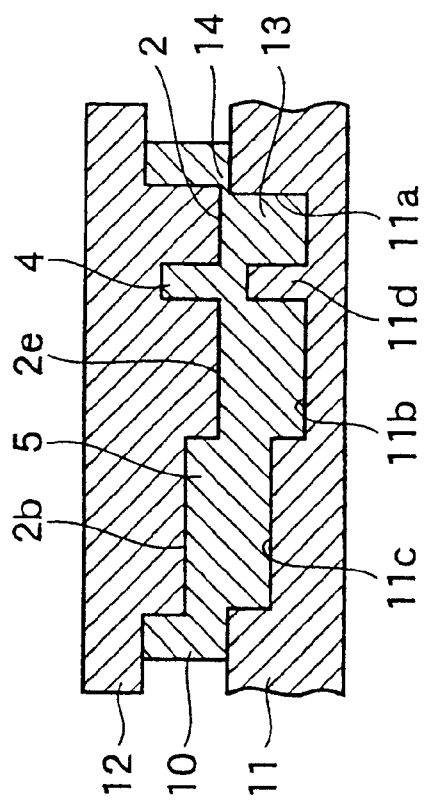
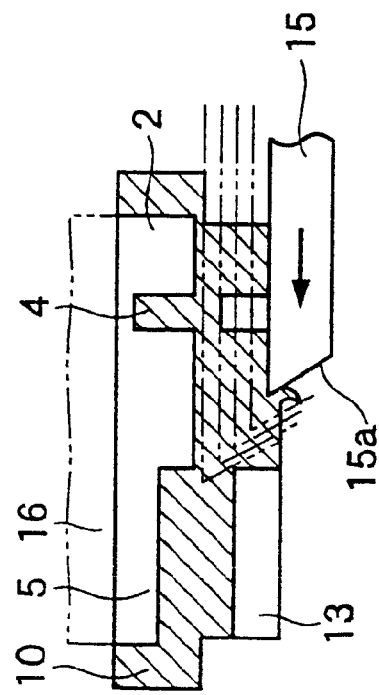
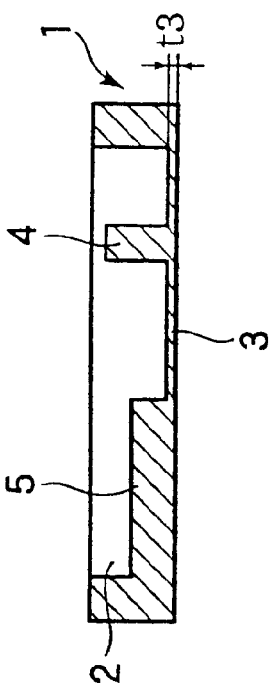
FIG. 1(A)
FIG. 1(B)
FIG. 1(C)
FIG. 1(D)

METHOD OF FORMING A CAVITY STRUCTURE WITH A THIN BOTTOM BASE PLATE

BACKGROUND OF THE INVENTION

The present invention relates to a method of forming a cavity structure having a thin bottom base plate and a predetermined oddly shaped hollowed section, which is made from metal plate and suitable for chassises or base members of micro machines, portable information equipments and so forth, and particularly to a forming method of a thin bottom base plate at the base of the hollowed section while preventing the hardening of the work piece.

Through the development of information technology, devices and equipments for office automation and/or portable information equipments have been changing into the form of micro machines due to reduction in their size and weight. Accordingly, the chassis and the base members for use in such micro machines are required to be more precise and miniaturized.

FIG. 3 illustrates one example of a base member for use in the one of above-mentioned micro-machines. For an instance, in the base member 1 having thickness from 3 mm to 5 mm, oddly shaped hollowed section 2 is formed in one side, and a bottom base plate 3 is formed so as to have the thickness as thin as about 0.2 mm at the bottom of the hollowed section 2. Thus, as a whole, the base member 1 is formed as a cavity structure. Further, in the hollowed section 2, there exists parts supporting means such as a supporting pole 4, a pedestal portion 5 and so forth for arranging and supporting electrical and/or mechanical parts not illustrated. The parts supporting means are formed integral with the bottom base plate 3 so as to have different heights from the bottom base plate 3 to their top. As mentioned above, such a base member of a micro-machine as a whole is required to be formed thin in order to minimize its size while enlarging its capacity for receipting the parts. Therefore, it becomes an important issue to form the bottom base plate 3 in the hollowed section 2 as thin as possible.

As a forming method of such a base member 1, it is generally known that forging processing by means of a press punching by a press and processing performed by die-casting molding are applied.

The forging processing by the use of the press is performed as following. A metal plate with approximately the same thickness as the base member 1 is placed on a die and is pressed by the punch (not illustrated) from one side thereof. The punch has substantially the same oddly shape as the hollowed section 2 to form the hollowed section 2 into the oddly shape. On the other hand, die-casting molding is performed in such manner that molten metal of aluminum or so forth is injected into a die-casting mold having the same shape as the base member 1.

However, in case of the forging processing by the press, the quantity of metal corresponding to the hollowed section 2 shifts to its periphery, and it lead to curling of the base member 1, as illustrated in FIG. 7(A), due to stress at the time of the shifting of the metal. Such remarkable deterioration of flatness is a serious problem for the base member 1. In order to cure this curling, it is necessary to execute additional processing such as flat press. However, it is almost impossible to cure completely the curling caused by such an internal stress. Further, there is another problem that it is impossible to form the thickness t1 of the bottom base plate 3 as thin and precise as desired because there exist a limit that the bottom base plate 3 cannot be pressed by the pressure more than the critical pressure due to the hardening of the bottom base plate 3 occurs at the press processing.

On the other hand, in the case of the method by means of die casting molding, as illustrated in FIG. 7(B), there is a problem that a hole 3a is formed because molten metal such as aluminum or so forth easily flows into the area of the mold having large thickness but is difficult to flow in the bottom base plate 3, that is to say, such area having thin thickness t1' where is intended to be formed as thin as about 0.2 mm or less. Furthermore, there is another problem that scale-down and/or strain occurs and, accordingly, dimension accuracy of the base member 1 deteriorates in the course where molten metal of high temperature cool down. Thus, it becomes necessary to perform re-processing such as grinding and so forth in order to obtain flatness with high precision. However, since the bottom base plate 3 of the hollowed section 2 is too thin to carry out the re-processing such as grinding and so forth so that the base member 1 with high precision cannot be obtained.

SUMMARY OF THE INVENTION

The present invention has been made in order to improve the above-mentioned problems in the conventional method. An object of the present invention is to provide a method for forming a cavity structure made of a metal plate in high precision and in low cost. The cavity structure has a cavity suitable for installing equipment parts of micro machines and the bottom surface of the cavity has supporting means for support the equipment parts.

The method for forming a cavity structure provided with a thin bottom plate is comprises the following steps. The first step is to deform plastically a part of a metal plate so as to form a cavity on one surface of a metal plate wherein the cavity has an oddly bottom surface provided with subsections being different from each other in depth. Simultaneously a protrusion is formed on the other surface of the metal plate by shifting an amount of metal corresponding to the cavity into the protrusion wherein the protrusion has substantially similar figure to the cavity. Then a coupling section, which keeps the protrusion integral with the metal plate, is formed so as to make the protrusion smaller than the cavity. And the protrusion is removed from the metal plate so as to make the other surface of the metal plate flat and to form the bottom plate of the cavity thin while remaining the coupling section.

The various features of novelty which characterize the invention are pointed out particularly in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

BRIEF DESCRIPTION OF THE DRAWINGS

FIG. 1(A) to FIG. 1(D) are process explanation views for illustrating a first forming method according to the present invention;

DETAILED DESCRIPTION OF THE PREFERRED EMBODIMENT

The forming method of the present invention will be described in detail below on the basis of the embodiment using accompanying drawings.

Figure 3:
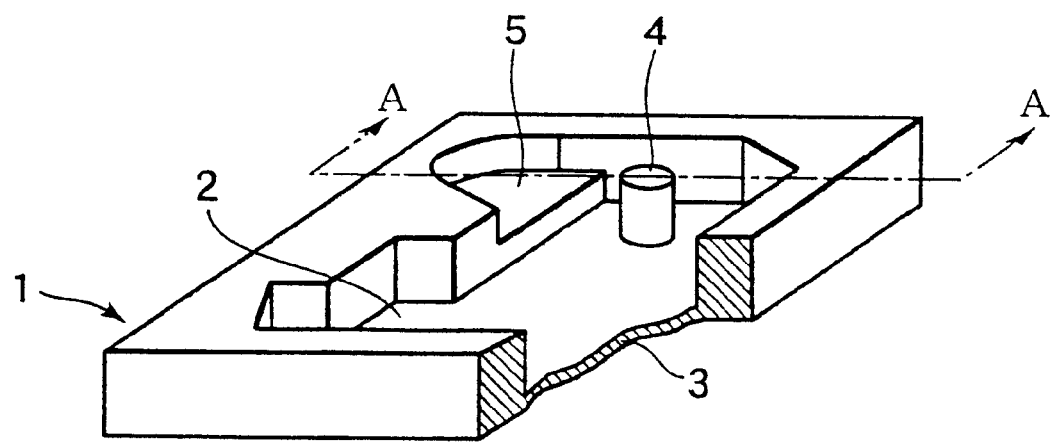
FIG. 3 is a perspective view illustrating product formed due to the present invention.

FIG. 3 illustrates one example of the final product which is formed by the cavity forming method for metal plate according to the present invention. FIG. 3 shows a base member for use in, for example, a micro-machine. Namely, as mentioned above, in the base member 1 with thickness from 3 mm to 5 mm, oddly shaped hollowed section 2 is formed in one side, and there is a bottom base plate 3 which is formed in such a way that thickness thereof is thin with degree of 0.2 mm at the base of the hollowed section 2, thus, as a whole, the base member 1 is formed into a cavity structure. Further, in the hollowed section 2, there exists a supporting pole 4, a pedestal portion 5 and so forth for arranging structural parts, which are not illustrated. These are formed integral with the bottom base plate 3. Their heights from the bottom base plate 3 are different from each other. As raw material of this base member 1, there is selected in accordance with various uses from among the metal plates such as aluminum, copper, stainless, brass and so forth capable of undergoing plastic processing. These are processed in such a way as a forming method explained hereinafter.

The First Embodiment

FIG. 1(A) to FIG. 1(D) which illustrate A—A section of FIG. 3 indicate the first embodiment of cavity forming method for the metal plate according to the present invention. FIG. 1(A) indicates a metal plate 10 with thickness from 3 mm to 5 mm, as a raw material of the above-mentioned base member 1. FIG. 1(B) illustrates a press process. The metal plate 10 is placed on a die 11 installed on a press machine which is not illustrated while determining position thereof. In the press process, operation is made to form a hollowed section 2 by a punch 12 mounted with movable side of the above press machine from one side of the metal plate 10.

Figure 2:
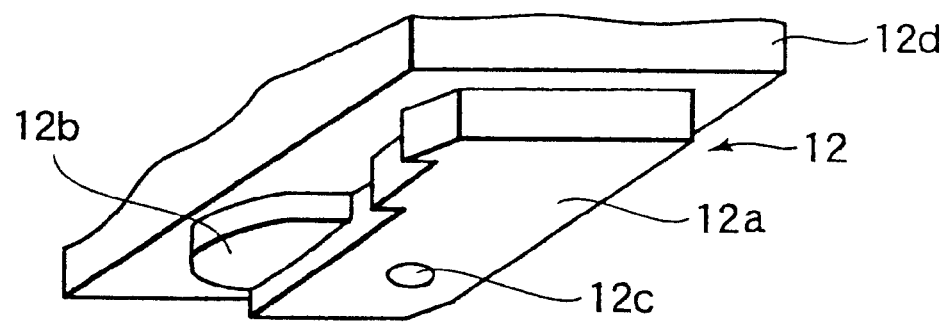
FIG. 2 is a perspective view illustrating a punch for forming a cavity.

The above punch 12, as illustrated in FIG. 2, is formed in such a way that a first pressing stand 12a, a second pressing stand 12b and a small hole 12c are formed to be integrated with a pedestal section 12d. The first pressing stand 12a forms a thin bottom base plate 3 in the base member 1 in such a way as to form deep hollow section 2a. The second pressing stand 12b forms shallow hollow section 2b. The small hole 12c forms a column shaped supporting pole 4.

On the other hand, with respect to die 11, as illustrated in FIG. 1(B), a concave section 11a consisting of a deep hollow section 11b, shallow hollow section 11c, and column shaped protruded section 11d for forming the supporting pole 4 is formed. The above concave section 11a is formed in a similar configuration somewhat smaller than an external form of the above punch 12.

The metal plate 10 is placed on the die 11 which is constituted as mentioned above. Operation is made to drop the punch 12 from one side of the metal plate 10. The hollowed section 2 is formed in one side of the metal plate 10. In this processing, quantity of metal corresponding to the hollowed section 2 is shifted into the concave section 11a of the die 11 so that a protrusion 13 with height approximately equal to depth of the hollowed section 2 is formed in the other side of the metal plate 10. Further, in the hollowed section 2, a supporting pole 4 and a pedestal 5 are formed integral with the protrusion 13 on the opposing side thereto.

As mentioned-above, the concave section 11a of the die 11 is formed in such a way as to become somewhat smaller than the external form of the punch 12. Consequently, when the punch 12 reaches at the lowest point, part of periphery of the punch 12 is opposed to upper end face of the die 11. The opposite interval is established in the dimension of being equal to the plate thickness of the base member 1, namely, a dimension of 0.2 mm or in the dimension of somewhat larger thickness than this dimension. According to this establishment, the hollowed section 2 and the protrusion 13 are coupled by a coupling section 14 with plate thickness approximately equal to the bottom base plate 3 of the base member 1. Thus the coupling section 14 keeps the protrusion 13 integral with base member 1.

FIG. 1(C) illustrates cutting process. In the cutting process, operation is made to cut the protrusion 13 which is formed at the other direction side of the metal plate 10 according to the above pressing process gradually in such a way that operation is made to cut the protrusion from the top side thereof to the extent that the protrusion 13 comes to the same surface as the base of the coupling section 14 by the use of a cutter 15 while dividing cutting process into a plurality of times as shown in FIG. 1(C) by the use of the chain line. The cutter 15 for use in the cutting process has a teeth section 15a with arrow shape protruding the top center. In the cutting process, operation is made to cut the protrusion 13 in such a way that it causes the cutter 15 to be moved in the arrow direction.

In this cutting process, amount-of-cutting which the cutter cuts the base member in one time is established in such a way that cutting height is equal to degree of thickness which does not give large load to the bottom base plate 3. Thus, operation is made to cut the protrusion 13 while dividing the cutting process into a plurality of times with such an amount-of-cutting. Also in this cutting process, in order to prevent displacement of the bottom base plate 3 in the direction of the hollowed section 2a by the cutter 15, it is desirable that disposition is made to press the bottom base plate 3 while inserting a holding measure 16 within the hollowed section 2.

Further, it is preferable that the cutting is executed alternately into a regular direction and a counter direction so that the number of cutting in the regular direction is equal to the number of cutting in the counter direction.

According to the above cutting process, operation is made to cut the protrusion 13 up to the state where the protrusion 13 comes to the same surface as the coupling section 14 while remaining the coupling section 14. In such a cutting process, the other direction side of the metal plate 10 is formed in flat condition as illustrated in FIG. 1(D), thus the base member 1 is perfected. At this time, the plate thickness t3 of the bottom base plate 3 of the hollowed section 2 is formed of the thickness in a degree of 0.2 mm. Further, if a thickness of the coupling section 14 is established in the same thickness as a plate thickness of the bottom base plate 3, cutting marks rest on only a part of protrusion 13. In order to take the whole surface of the other direction side of the metal plate 10 to be the same surface condition, the coupling section 14 is established in connection with its plate thickness into somewhat thick more than a plate thickness of the bottom base plate 3. Subsequently, operation is made to process the bottom base plate 3 into specified plate thickness while cutting the whole surface of the other direction side at the time of final cutting processing. Also, in the cutting process, with the exception of the cutter 15, it is suitable that a grinder, a sand paper, or another cutting means such as a milling cutter are used independently or are used jointly.

According to the first embodiment, the base member 1 is formed while sifting the quantity of metal corresponding to volume of the hollowed section 2 to the other direction side of the metal plate 10, stress influence to the metal plate 10 can be minimized. Consequently, curling phenomenon of the metal plate 10 is prevented and excellent flatness of the plane of the finished product is obtained. Furthermore, in the processing, since operation is made to cut the protrusion 13 formed to be protruded in the other direction side of the metal plate 10 in such a manner as to divide cutting process into a plurality of times, it is possible to make the plate thickness of the bottom base plate 3 of the hollowed section 2 thin up to a limit of degree of 0.2 mm.

When the thickness of the metal plate is so thin as less than 3 mm, the method is also applicable in such manner that the processing of cutting the protrusion is executed only one time so as to make the other side of the metal plate flat.

The Second Embodiment

Figure 4A:
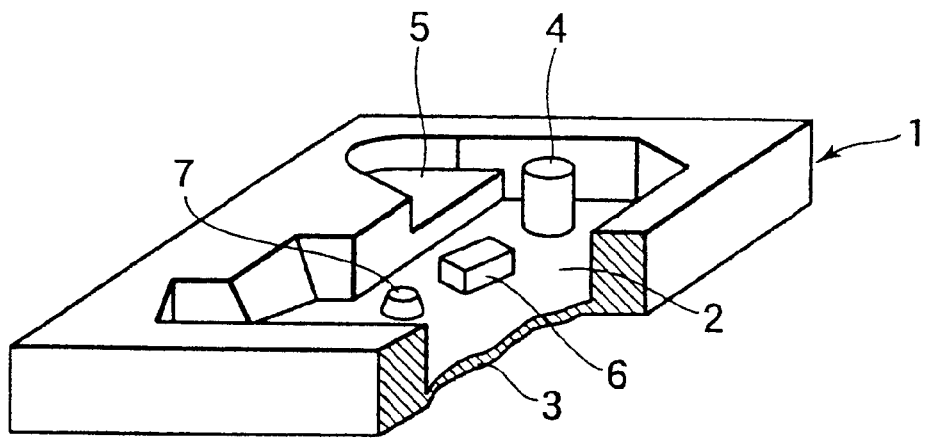
FIG. 4(A) and FIG. 4(B) are perspective views illustrating other products formed due to the present invention.
Figure 4B:
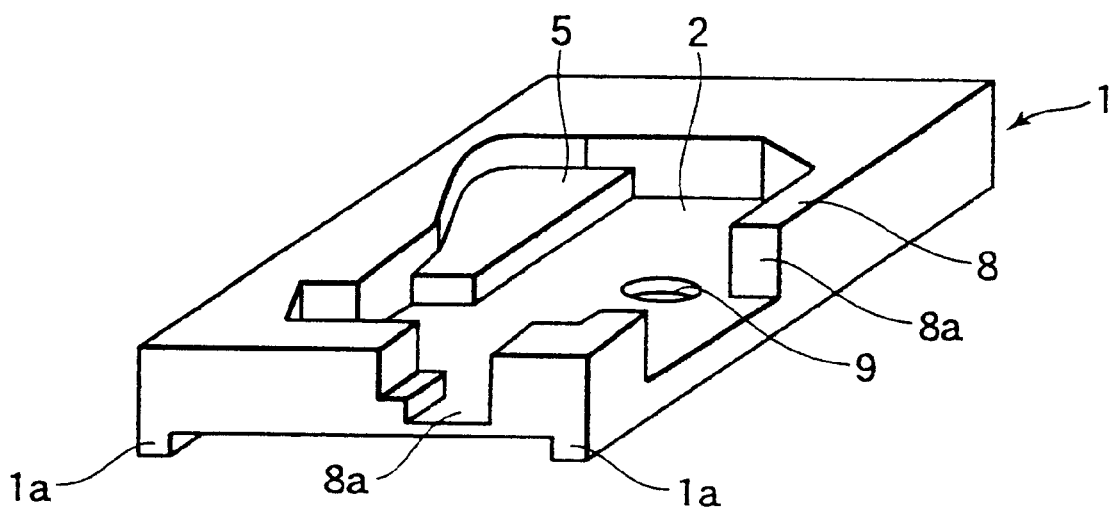

FIG. 4(A) and FIG. 4(B) illustrate another state of the base member 1 formed by the aforementioned forming method. Namely, a form illustrated in FIG. 4(A) forms a square stand 6 and a conical stand 7 monolithically integrated therewith with the exception of supporting pole 4 from the hollowed section 2. Further, FIG. 4(B) illustrates that a notch section 8a is formed on a peripheral convex bank 8. Furthermore, an opening 9 is formed in the hollowed section 2. The opening 9 forms a protruded shaft which is higher than the first pressing stand 12a formed on the punch 12. It causes protrusion to be protruded corresponding to the protruded shaft at the other direction side of the metal plate 10. It is possible to form in such a way as to cut the protrusion by the cutter 15. Moreover, the base member 1 forms rib 1a on its rear side of both edges monolithically integrated therewith for the sake of reinforcement. It is possible to form the rib 1a on the aforementioned respective base members 1. Further, it is possible to change a shape of the hollowed section 2 and/or a shape of peripheral convex bank variously. Furthermore, it is suitable that the opening is formed by the punching processing, after forming the bottom base plate 3 of the hollowed section 2.

Figure 5A:
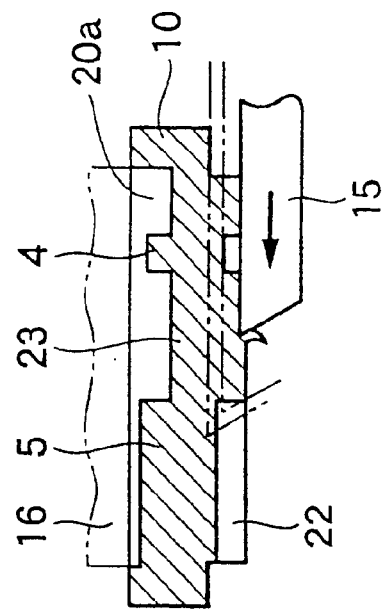
FIG. 5(A) to FIG. 5(D) are process explanation views illustrating a second forming method according to the present invention.

FIGS. 5(A) to 5(D) illustrates a second embodiment of a forming method of a hollowed section having thin bottom base plate according to the present invention. FIG. 5(A) indicates a first pressing process, in which processing is made to press the punch 12 from one side of the metal plate 10 in such a way that the processing is made to form a first hollowed section 20a with approximately half depth with respect to predetermined depth and the processing is made to move the quantity of metal of this first hollowed section 20a to protrude to be formed a first protrusion 22 with small height approximately equal to depth of the first hollowed section 20a at the other direction side of the metal plate 10. At this time, a supporting pole 4 and a pedestal 5 whose heights are lower than the predetermined height in the first hollowed section 20a.

In the aforementioned first pressing process, if the die 21 is compared with the die 11, the die 21 has abut the same constitution as the die 11 illustrated in FIG. 2(B) illustrating fundamental constitution. Namely, in the first pressing process, operation is made to form a concave section 21a consisting of a deep hollowed section 21b and shallow hollowed section 21c, and a column shaped protruded section 21d for forming supporting pole 4, further the concave section 21a into a slightly smaller similar figure than the external form of the punch 12. The die 21 is different from the die 11 illustrated in the above-mentioned FIG. 2(B) in that depth of the concave section 21a is established into half depth to the predetermined depth. Thus, the first press processing causes the concave section 21a to be shallow so that processing is made to limit height and shape of the first protrusion 22 which is protruded to be formed on the other direction side of the metal plate 10 in some degrees. Moreover, it is also suitable that in the first pressing process, processing is made to use the die 11 illustrated in FIG. 2(B), which is capable of processing the concave section 21a with predetermined depth.

Figure 5B:
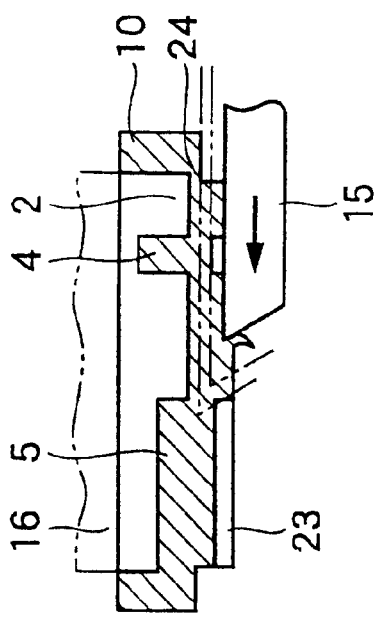

FIG. 5(B) illustrates the first cutting process. In the first cutting process, processing is made to cut gradually the first protrusion 22 formed on the other direction side of the metal plate 10 by the first pressing process in such a manner as to divide the cutting process into a plurality of times and cutting it from the top side thereof by the use of the cutter 15. In this first cutting process, a cutting depth which the cutter 15 cut in every one time is established into a degree of thickness that does not give large load to the bottom base plate 3 formed by the first pressing process. Practically, since the first protrusion 22 is formed with low height, displacement for the side of the bottom base plate 3 is small caused by the pressing force of the cutter 15. Further, in order to prevent the displacement of the bottom base plate 3 in the direction of the hollowed section 20a caused by the cutter 15, it is suitable that action is made to press while inserting pressing measure 16 within the hollowed section 20a.

Figure 5C:
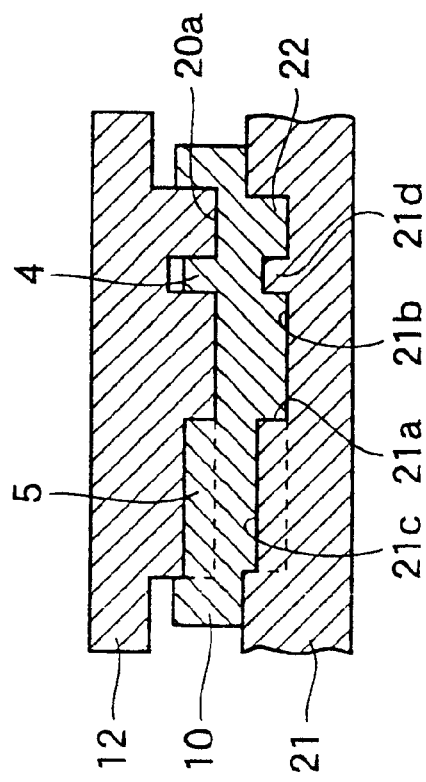

FIG. 5(C) illustrates the second pressing process. In the second pressing process, processing is made to press again the punch 12 onto the first hollowed section 20a formed on the one side of the metal plate 10 to form a hollowed section 2 with predetermined depth as the base member 1. And the processing is made to move the quantity of metal of the hollowed section 2 produced caused by the pressing to the concave section 21a by the die 21, followed by protruding to be formed a second protrusion 23 with low height on the other direction side of the metal plate 10. On this occasion, the supporting pole 4 with predetermined height and the pedestal portion are formed on the hollowed section 2.

Also in this example, As mentioned-above, the concave section 21a of the die 21 is formed in such a way as to become somewhat smaller than the external form of the punch 12. Consequently, when the punch 12 reaches at the lowest point, part of periphery of the punch 12 is opposed to upper end face of the die 21. The opposite interval is established in the dimension of being equal to the plate thickness of the base member 1, namely, a dimension of 0.2 mm or in the dimension of somewhat larger thickness than this dimension. According to this establishment, the hollowed section 2 and the second protrusion 23 are coupled by a coupling section 24 with plate thickness approximately equal to the bottom base plate 3 of the base member 1.

Figure 5D:
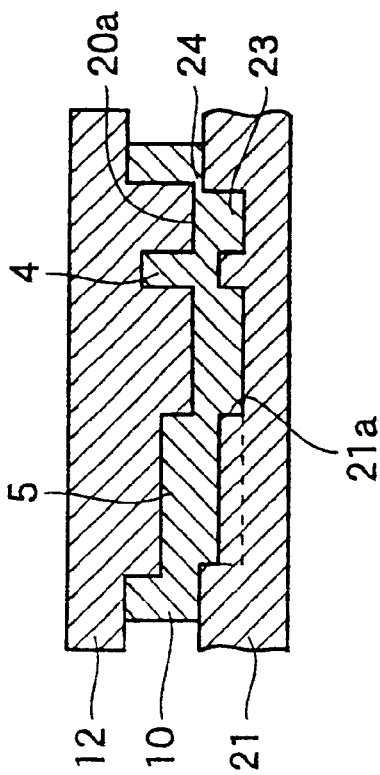

FIG. 5(D) illustrates the second cutting process. In the second cutting process, processing is made to cut gradually the second protrusion 23 formed on the other direction side of the metal plate 10 by the second pressing process in such a manner as to divide the cutting process into a plurality of times and cutting it from the top side thereof by the use of the cutter 15 up to the same surface as the base of the coupling section 24. As a result thereof, the bottom base plate 3 with plate thickness of 0.2 mm in the base of the hollowed section 2. In this second cutting process, a cutting depth which the cutter 15 cut in every one time is established into a degree of thickness that does not give large load to the bottom base plate 3 formed by the second pressing process. Practically, since the second protrusion 23 is formed with low height, displacement for the side of the bottom base plate 3 is small caused by the pressing force of the cutter 15. Further, also in order to prevent the displacement of the bottom base plate 3 in the direction of the hollowed section 20b caused by the cutter 15, it is suitable that action is made to press while inserting pressing measure 16 within the hollowed section 20b.

According to the above second cutting process, operation is made to cut the protrusion 23 up to the state where the protrusion 23 comes to the same surface as the coupling section 24 while remaining the coupling section 24. In such a cutting process, the other direction side of the metal plate 10 is formed in flat condition, thus the base member 1 is perfected. At this time, the plate thickness of the bottom base plate 3 of the hollowed section 2 is formed of the thickness in a degree of 0.2 mm. Further, if a thickness of the coupling section 24 is established in the same thickness as a plate thickness of the bottom base plate 3, cutting marks rest on only a part of protrusion 23. In order to take the whole surface of the other direction side of the metal plate 10 to be the same surface condition, the coupling section 24 is established in connection with its plate thickness into somewhat thick more than a plate thickness of the bottom base plate 3. Subsequently, operation is made to process the bottom base plate 3 into specified plate thickness while cutting the whole surface of the other direction side at the time of final cutting processing. Also, in the cutting process, with the exception of the cutter 15, it is suitable that a grinder, a sand paper, or another cutting means such as a milling cutter are used independently or are used jointly.

In the aforementioned second embodiment, the pressing process and the cutting process are repeated two times respectively. Further, in the cutting process, the number of times of cutting process is divided into a plurality of times. As another method except for this example, in the pressing process, processing is made to form the protrusion in such a way as to have height thereof equal to one time cutting, before cutting the protrusion by the cutting process, subsequently, further cutting after forming the protrusion for one time cutting is repeated a plurality of times so that the hollowed section with the predetermined depth and the bottom base plate are formed.

The Third Embodiment

FIGS. 6(A) to 6(D) indicate a third embodiment for forming a hollowed section having thin bottom base plate according to the present invention. In the first place, processing is made to form shallow hollowed section by the forging process before the processing is made to form the hollowed section by the pressing process in the same way as the aforementioned first embodiment. And, the processing is made to form a protrusion on the other direction side of the metal plate. Subsequently, the processing is made to cut the protrusion by the cutting process to form the base member 1. The metal plate 10 which is used in the third embodiment is the same as the metal plate materials used in the first embodiment. Also, a punch 12 which is used in the third embodiment is the same as that of the first embodiment in connection with its fundamental constitution. Accordingly, explanation thereof is omitted.

Figure 6A:
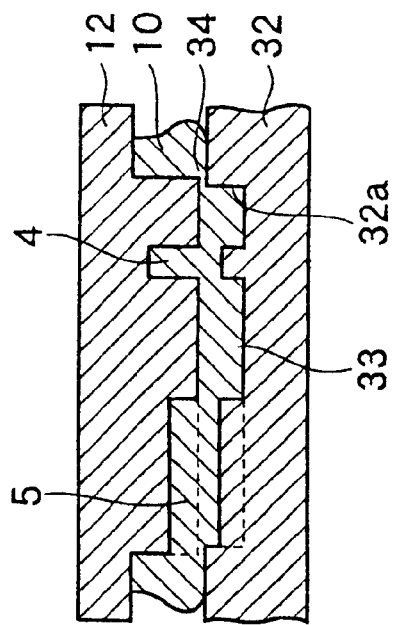
FIG. 6(A) to FIG. 6(D) are process explanation views illustrating forming process of a third forming method of a cavity according to the present invention.

FIG. 6(A) indicates a forging process. In the forging process, action is made to position to be placed the metal plate 10 to be materials of the base member 1 on the die 30 whose upper surface is made flat. Processing is made to execute forging by the punch 12 from one side of the metal plate 10 to form a first shallow hollowed section 31. At this time, the metal plate 10 is pressed in the most deeply by the first pressing stand 12a of the punch 12. However, as is mentioned above, since the metal plate has a property of occurrence of work hardening when pressing it up to certain limit thereof, opposite interval 2t between the first pressing stand 12a and the die 30 is established in the range where the metal plate 10 is capable of being pressed. Accordingly, since the interval between the die 30 and the first pressing stand 12a of the punch 12 is established of the dimension which is larger than the thickness of the bottom base plate 3, the first hollowed section 31 is formed in shallow state. In this forging process, the quantity of metal corresponding to volume of the first hollowed section 31 move to periphery of metal plate 10 to expand as illustrated in the drawing.

Figure 6B:
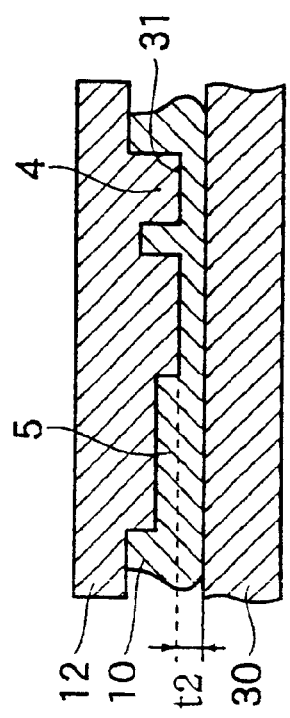

The metal plate 10 via the forging process is moved to the pressing process indicated in FIG. 6(B). The metal plate 10 is placed on the die 32. In the pressing process, processing is made to form a hollowed section 2 with the predetermined depth while dropping the punch 12 into the first hollowed section 31 formed on the metal plate 10. And the processing is made to move the quantity of metal of the hollowed section 2 pressed by the punch 12 to the concave section 32a. The processing is made to protrude to be formed a protrusion 33 at the other direction side of the metal plate 10. At this time, the protrusion 33 is formed in the state of low height because the first hollowed section 31 is already formed in the forging process. Further, the supporting pole 4 and the pedestal section 5 formed in the hollowed section 2 are increased as high as predetermined height.

As mentioned-above, the concave section 32a of the die 32 is formed in such a way as to become somewhat smaller than the external form of the punch 12 with resemblance shape. Consequently, when the punch 12 reaches at the lowest point, part of periphery of the punch 12 is opposed to upper end face of the die 32. The opposite interval is established in the dimension of being equal to the plate thickness of the base member 1, namely, a dimension of 0.2 mm or in the dimension of somewhat larger thickness than this dimension. According to this establishment, the hollowed section 2 and the protrusion 33 are coupled by a coupling section 34 with plate thickness t3 of the bottom base plate 3.

Figure 6C:
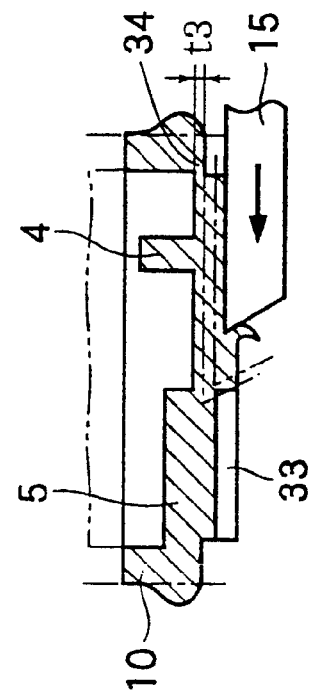

The metal plate 10 formed in such a way as above shifts to next cutting process. Namely, as illustrated in FIG. 6(C), in the cutting process, operation is made to cut the protrusion 33 which is formed at the other direction side of the metal plate 10 gradually in such a way that operation is made to cut the protrusion from the top side thereof to the extent that the protrusion 33 comes to the same surface as the base of the coupling section 34 by the use of a cutter 15 while dividing cutting process into a plurality of times. The cutter 15 for use in the cutting process is the same as that used in the first and the second embodiment.

In this cutting process, amount-of-cutting which the cutter cuts in one time is established in such a way that cutting height is equal to degree of thickness which does not give large load to the bottom base plate 3 formed on the base of the hollowed section 2. Also in this cutting process, in order to prevent displacement of the bottom base plate 3 in the direction of the hollowed section 2a by the cutter 15, it is desirable that disposition is made to press the bottom base plate 3 while inserting a holding measure 16 within the hollowed section 2

Figure 6D:
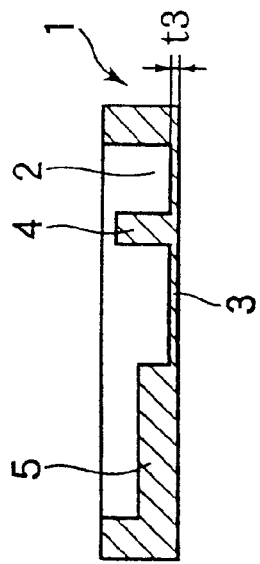
Figure 7A:
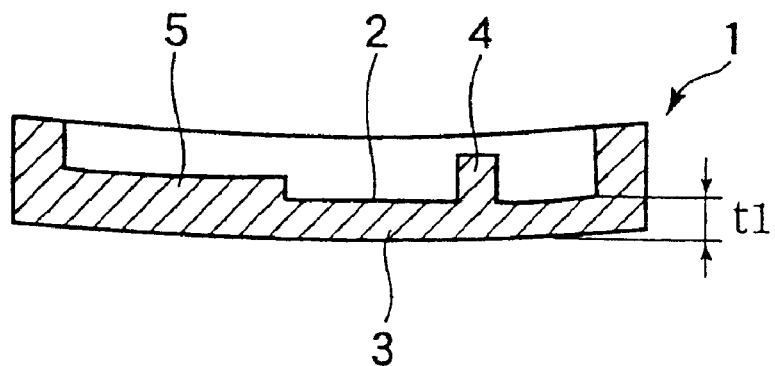
FIG. 7(A) and FIG. 7(B) are sectional views illustrating product produced due to the conventional forming method.
Figure 7B:
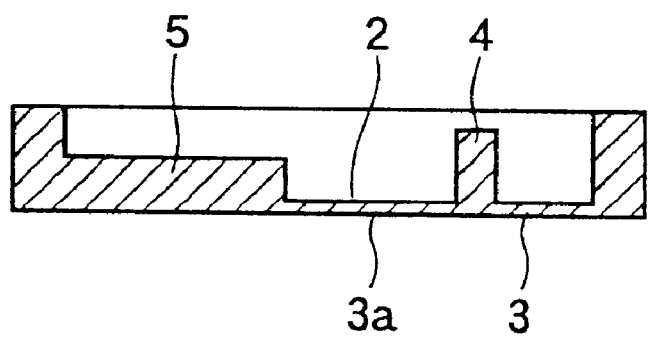

According to the above cutting process, processing is made to form the other direction side of the metal plate 10 flatly in such a manner that the processing is made to cut the protrusion 33 while dividing the cutting process into a plurality of times and the processing is made to cut it up to the state where height of the protrusion is equal to the same surface as the coupling section 34. However, in this state, the quantity of metal remains expanded in periphery of the metal plate 10, therefore, in the final punching process which is not illustrated, processing is made to punch to be formed the metal plate with the expanded portion removed by the punching of the external form as illustrated in two-dot chain line of FIG. 6(C). Thus the processing is made to complete the base member 1 which has the predetermined dimension as illustrated in FIG. 6(D). Also, in the second embodiment, the plate thickness of the bottom base plate 3 of the hollowed section 2 is formed into thickness of degree of 0.2 mm.

Furthermore, in the same way as the aforementioned first embodiment, in order to take the whole surface of the other direction side of the metal plate 10 to be the same surface condition, operation is made to process the bottom base plate 3 into specified plate thickness while cutting the whole surface of the other direction side at the time of final cutting processing. Also, in the cutting process, with the exception of the cutter 15, it is suitable that a grinder, a sand paper, or another cutting means such as a milling cutter are used independently or are used jointly in the same way as the first and the second embodiment.

Also in cases where, processing is made to form the base member 1 by the above mentioned third embodiment from the metal plate 10, in the forging process, processing is made to execute the forging processing within the range which is capable of being pressed by the press with respect to the metal plate 10. Subsequently, since the processing is made to move the quantity of metal to the other direction side of the metal plate 10 when deepening the first hollowed section 31, it is possible to suppress the stress influencing to the metal plate 10 in the minimum state. Moreover, since the processing is made to gradually cut the protrusion 33 protruded to be formed at the other direction side of the metal plate 10 while dividing the cutting process into a plurality of times, it is possible to be thin the bottom base plate 3 of the hollowed section 2 into the limit of degree of 0.2 mm.

In the aforementioned embodiments, in cases where the plate thickness of the metal plate is thin, and height of the protrusion is low, also it is suitable that processing is made to execute respective processes of the pressing process and the cutting process one time each. Further, it is suitable that processing is made to form the hollowed section into conical shape except for square shape, thus it is suitable that the hollowed section is formed into arbitrary shape in accordance with the use of the micro-machine and so forth. The present invention is not restricted to the above-described respective embodiments, thus the present invention is capable of being modified within the limit of the present invention.

As mentioned above, according to the cavity forming method for the metal plate in accordance with the present invention, since processing is made to move a mass of metal corresponding to the volume of the hollowed section formed on the one side of the metal plate toward the other direction side of the metal plate, it is possible to suppress the stress influencing the metal plate with the minimum. Thus, curling phenomenon of the metal plate is suppressed. Accordingly, it is possible to complete degree of flatness of the metal plate into the suitable state. Further, since the processing is made to cut the protrusion protruded to be formed on the other direction side of the metal plate gradually while dividing the cutting process into a plurality of times, it is possible to make thin the plate thickness of the bottom base plate formed on the hollowed section to the limit of the degree of 0.2 mm.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. A method for forming a cavity structure provided with a thin bottom plate comprising the steps of:

plastically deforming a part of a metal plate so as to form a cavity having a profile of a predetermined shape on a first surface side of the metal plate, said cavity having a bottom surface formed in a rugged shape provided with subsections different from each other in depth;

simultaneously forming a protrusion on a second surface side of the metal plate, which is a rear side of said first surface side, by shifting an amount of metal corresponding to said cavity into said protrusion, said protrusion having a rugged shaped top surface with a substantially similar configuration to said bottom surface of said cavity;

forming a coupling section for keeping said protrusion integral with the metal plate at the circumference of the protrusion by making an outline of said protrusion smaller than an outline of said cavity; and removing said protrusion from the metal plate so as to make said second surface side of the metal plate flat and to form said thin bottom plate of said cavity while retaining said coupling section.

2. A method for forming a cavity structure according to claim 1, wherein said coupling section is approximately equal to said bottom plate in thickness.

3. A method for forming a cavity structure according to claim 1, wherein the step of plastically deforming the metal plate is executed by the use of a press and the step of removing said protrusion from the metal plate is executed by cutting.

4. A method for forming a cavity structure according to claim 1, wherein said bottom surface formed in a rugged shape includes a support for supporting equipment parts to be installed in said cavity.

5. A method for forming a cavity structure according to claim 3, wherein said press comprises a punch having a shape for defining the outline of said cavity and a die on which the metal plate is supported, said die having a die concave portion at a position opposite to said punch, said die concave portion defining an outline of said protrusion and being formed smaller than said punch in such manner that a surface of said die surrounding said die concave portion opposes an edge periphery surface of said punch, and wherein said method comprises the steps of:

pressing said part of the metal plate using said punch so as to form said cavity while forming said protrusion in said die concave portion; and stopping said punch at a position where an interval between said surface of said die surrounding said die concave portion and said edge periphery surface of said punch is equal to a thickness of said coupling section.

6. A method for forming a cavity structure according to claim 3, further comprising the step of: cutting the entire surface of said second surface side of the metal plate so as to form said thin bottom plate.

7. A method for forming a cavity structure according to claim 3, wherein the step of removing said protrusion from the metal plate is executed in such a manner that said protrusion is cut repeatedly and bit by bit until the second surface side of the metal plate is coplanar with a second surface side of said coupling section.

8. A method for forming a cavity structure according to claim 7, wherein the step of removing said protrusion from the metal plate is executed by a cutting tool which cuts alternately in a regular direction and a counter direction.

9. A method for forming a cavity structure according to claim 1, wherein depth of said subsections of said bottom surface formed in a rugged shape is substantially equal to the height of said rugged shaped top surface of said protrusion corresponding to said subsections.

10. The method for forming a cavity structure according to claim 1, including repeatedly executing the steps of plastically deforming said part of the metal plate, simultaneously forming said protrusion and removing said protrusion until the subsections of the bottom surface are at predetermined depths.

11. A method for forming a cavity structure in a thin bottom plate comprising the steps of:
    inserting a metal plate between a punch and a die, the punch having a profile defined by outwardly projecting subsections having different lengths for contacting said metal plate and said die having receiving subsections substantially corresponding to said outwardly projecting subsections;
    powering said punch to deform said metal plate so as to form a cavity on a first surface of said metal plate, said formed cavity having a first set of shaped receiving regions with different depths corresponding to the profile defined by said projecting subsections;
    simultaneously forming a second set of shaped projecting regions on a second opposing surface of said metal plate by movement of metal corresponding to said cavity formed in the first surface of said metal plate into the receiving subsections of said die;
    maintaining a coupling section of said metal plate between said closed punch and said die so that said metal plate remains integral by having an outer periphery of the projecting subsections greater than an outer periphery of the receiving subsections of said die; and
    removing said shaped projecting regions from said second surface of said metal plate to provide the second surface for said thin bottom plate as a flat planar surface,
    wherein having the outer periphery defining said projecting subsections greater than the outer periphery of the receiving subsections of said die prevents the metal plate at the coupling section from breaking when the shaped projecting regions are removed from the second surface of the metal plate.

12. The method for forming a cavity structure according to claim 11, including the step of:
    inserting a holding measure into the formed cavity having the first set of shaped receiving regions before removing said shaped projecting regions from said second surface of said metal plate.

13. The method for forming a cavity structure according to claim 11, wherein said coupling section has a thickness of no more than 0.2 mm.

14. The method for forming a cavity structure according to claim 13, wherein said metal plate has a thickness of between 3 mm and 5 mm about the outer periphery of the formed cavity.

15. The method for forming a cavity structure according to claim 11, wherein said first set of shaped receiving regions with different depths includes a pedestal region having a depth greater than the metal plate at the outer periphery of the cavity and less than the greatest depth of the cavity.

16. The method for forming a cavity structure according to claim 15, wherein said first set of shaped receiving regions with different depths includes a support region in the cavity functioning as a support projecting in an outward direction, the support region having a depth less than the pedestal portion.

17. The method for forming a cavity structure according to claim 11, including the step of securing equipment parts to a support formed by a support region, the support region comprising one of said first set of shaped receiving regions with different depths of said cavity.

18. The method for forming a cavity structure according to claim 11, wherein the step of removing said shaped projecting regions from said second surface of said metal plate comprises cutting the projecting regions.

19. The method for forming a cavity structure according to claim 11, wherein the step of removing said shaped projecting regions from said second surface of said metal plate comprises cutting the projecting regions repeatedly until a cut surface of said projecting regions is coplanar with the coupling section.

20. The method for forming a cavity structure according to claim 11, including repeating the step of powering the punch to deform said metal plate and repeating the step of removing the shaped projecting regions formed by the punch until the values of the depths of the first set of shaped receiving regions are at predetermined depths.

* * * * *